United States Patent
Webster et al.

(10) Patent No.: US 7,103,112 B2
(45) Date of Patent: Sep. 5, 2006

(54) TRANSMIT FREQUENCY DOMAIN EQUALIZER

(75) Inventors: Mark A. Webster, Indian Harbour Beach, FL (US); Paul J. Chiuchiolo, Melbourne, FL (US); Harold P. Phares, Melbourne, FL (US)

(73) Assignee: Conexant, Inc., Red Bank, NJ (US)

( * ) Notice: Subject to any disclaimer, the term of this patent is extended or adjusted under 35 U.S.C. 154(b) by 633 days.

(21) Appl. No.: 10/011,580

(22) Filed: Dec. 4, 2001

(65) Prior Publication Data

US 2003/0103579 A1     Jun. 5, 2003

(51) Int. Cl.
H04L 27/36  (2006.01)
H04B 3/04   (2006.01)
H04B 3/14   (2006.01)
H04B 1/76   (2006.01)

(52) U.S. Cl. ............ 375/298; 375/296; 375/229; 375/261

(58) Field of Classification Search .............. 375/298, 375/229, 230, 232, 231; 370/203, 204, 206, 370/208, 210; 330/28 R; 333/28 R
See application file for complete search history.

(56) References Cited

U.S. PATENT DOCUMENTS

| | | | | |
|---|---|---|---|---|
| 5,479,447 A | * | 12/1995 | Chow et al. | 375/260 |
| 6,140,822 A | * | 10/2000 | Williams | 324/620 |
| 6,141,317 A | * | 10/2000 | Marchok et al. | 370/208 |
| 6,285,412 B1 | | 9/2001 | Twitchell | |
| 6,411,657 B1 | * | 6/2002 | Verbin et al. | 375/285 |
| 6,549,512 B1 | * | 4/2003 | Wu et al. | 370/210 |
| 2003/0035495 A1 | * | 2/2003 | Laamanen et al. | 375/296 |

FOREIGN PATENT DOCUMENTS

| WO | WO 98 59471 A | 12/1998 |
|---|---|---|
| WO | WO 02 23781 A | 3/2002 |

OTHER PUBLICATIONS

IEEE 802.11a-1999 Wireless LAN Medium Access Control (MAC) and Physical Layer (PHY) specifications-Amendment 1: High-speed Physical Layer in the 5 GHz band. 1999, IEEE, pp. 1-83.*
Tuthill J. et al., "Automatic Digital Pre-Compensation in IQ Modulators," 1999 IEEE International Conference on Acoustics, Speech, and Signal Processing. Proceedings. ICASSP99 (Cat No. 99CH36258), Phoenix, AZ, USA, 15-19, pp. 1621-1624 vol. 3, XP002235487, 1999, Piscataway, NJ, USA, IEEE, USA ISBN: 0-7803-5041-3.
PCT Notification of Transmittal of the International Search Report or the Declaration dated Apr. 4, 2003, 6 pages.

* cited by examiner

Primary Examiner—Temesghen Ghebretinsae
Assistant Examiner—Juan Alberto Torres
(74) Attorney, Agent, or Firm—Hunton & Williams, LLP

(57) ABSTRACT

A transmit processor that includes a transmit frequency domain equalizer (TX FEQ) that pre-compensates packets in the frequency domain to flatten transmit filter response to improve the spectral mask and reduce packet error rate (PER). The TX FEQ taps may be selected so that the average power at the output equalize the average power applied to the input. The TX FEQ may be designed to yield 64 QAM packets with no quantization distortion at the input of the an Inverse Fast Fourier Transform (IFFT) processor. The 64 QAM constellation map points and TX FEQ gain values are selected to avoid exceeding the bit resolution of the IFFT processor. The tones may be bound together into zones to reduce implementation complexity by reducing the number of TX FEQ taps.

22 Claims, 12 Drawing Sheets

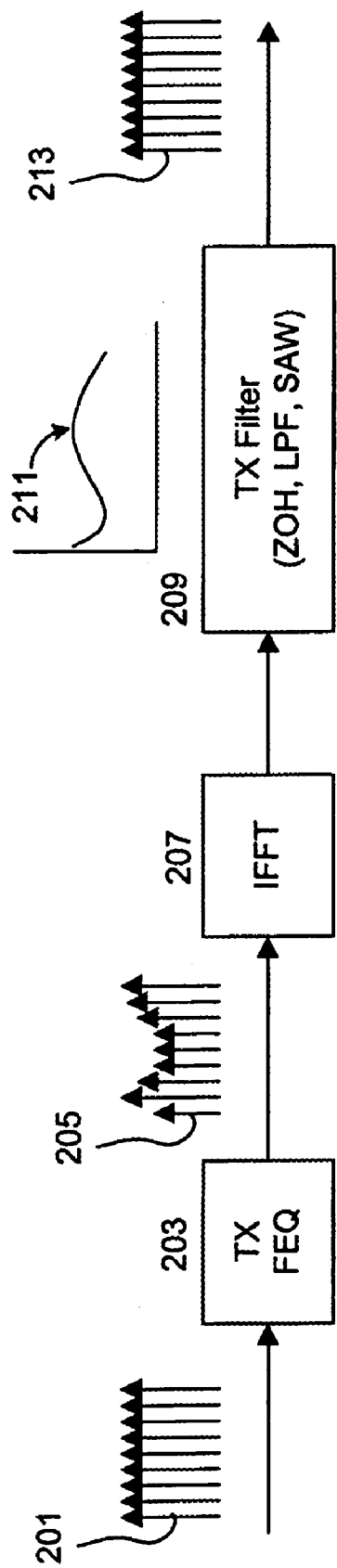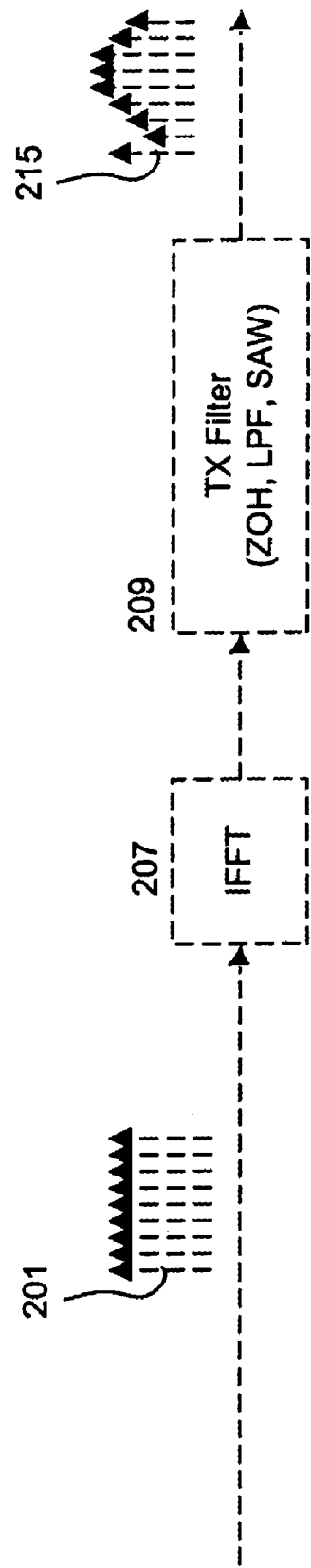
FIG. 2A
FIG. 2B
PRIOR ART

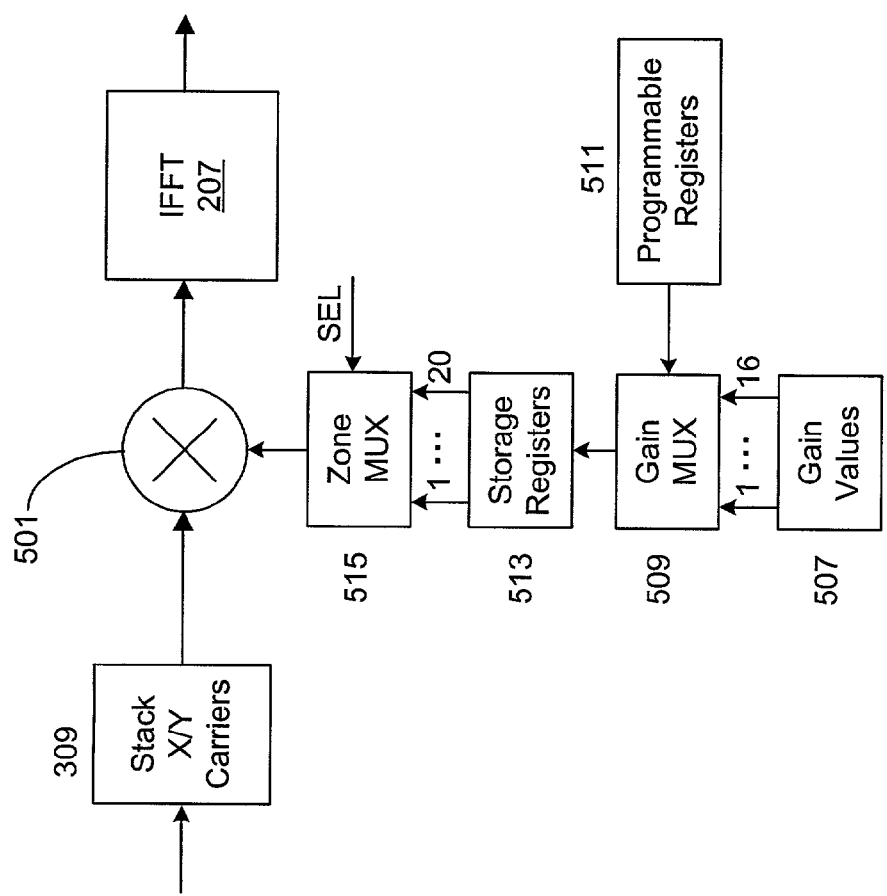

TRANSMIT FREQUENCY DOMAIN EQUALIZER

FIELD OF THE INVENTION

The present invention relates to wireless communications, and more particularly to a transmit frequency domain equalizer that pre-compensates symbol tones to flatten the transmit filter response and to remove quantization distortion for high data rate modulation.

DESCRIPTION OF RELATED ART

Filtering within a wireless radio frequency (RF) transmitter often adds frequency domain ripple and/or slew causing a significant level of distortion. The sources of such distortion include the digital to analog converter (DAC), low pass filters (LPFs) and SAW filtering. The DAC holds the signal sample level flat for the sample time causing zero-order hold (ZOH) distortion which adds wide spectral shaping to the signal. Furthermore, digital design constraints and limitations result in quantization errors due to rounding of digital values. The combined filter response may violate spectral mask requirements and degrade packet error rate (PER) performance.

SUMMARY OF THE INVENTION

A transmit processor using multiple sub-carriers to modulate data for transmission via a wireless channel according to an embodiment of the present invention equalizes the sub-carriers to pre-compensate for transmit filtering that may otherwise cause a variant frequency response. The transmit processor includes a data modulator, an Inverse Fast Fourier Transform (IFFT) processor and a transmit frequency domain equalizer. The data modulator incorporates data bits onto the sub-carriers according to a selected data rate and the IFFT processor converts frequency domain signals into time domain signals. The transmit frequency domain equalizer employs multiple taps to pre-compensate the sub-carriers for the variant frequency response of the radio.

In one embodiment, the data modulator includes a constellation map select with multiple constellation maps for supporting multiple data rates. Each constellation map incorporates corresponding normalization power gains that maintain relatively constant power across the constellation maps. The constellation maps include a 64 Quadrature Amplitude Modulation (QAM) constellation map that uses a selected normalization power gain that minimizes quantization distortion for 64 QAM. In a specific configuration, the constellation map select includes a 64 QAM constellation map with constellation points $\pm 1$, $\pm 3$, $\pm 5$ and $\pm 7$ and a normalization power gain of 1, a 16 QAM constellation map with constellation points $\pm 6.125$, $\pm 2.0625$ and a normalization power gain of 2.0625, a Quadrature Phase Shift Keying (QPSK) constellation map with constellation points $\pm 4.5625$ and a normalization power gain of 4.5625, and a Binary Phase Shift Keying (BPSK) constellation map with constellation points $\pm 6.5$ and a normalization power gain of 6.5.

The transmit frequency domain equalizer may include a memory that stores multiple gain values for programming the taps and a digital multiplier that multiplies an output of the constellation map select with a selected gain value and that asserts a corresponding output to the IFFT processor. The IFFT processor may have a predetermined bit resolution. In one configuration, a maximum gain value is chosen so that when multiplied by a maximum constellation point magnitude from the 64 QAM constellation map does not exceed the predetermined bit resolution of the IFFT processor. The remaining gain values may be selected based on specifications and symmetry. For example, a nominal gain value is chosen based on the maximum gain value and a maximum desired gain differential. A minimum gain value is chosen to maintain symmetry with the maximum gain value with respect to the nominal gain value. The remaining gain values are chosen to maintain symmetry between the minimum and maximum gain values with respect to the nominal gain value. The maximum desired gain differential may be based on the IEEE 802.11a specification for Orthogonal Frequency Division Multiplexing (OFDM). In a specific configuration, the predetermined bit resolution of the IFFT processor is 9 bits and the gain values are selected as 16, 18, 19, 20, 21, 22, 23, 24, 25, 26, 27, 28, 29, 30, 32 and 36, corresponding to decibel (dB) gain values of $-3.52$, $-2.49$, $-2.03$, $-1.58$, $-1.16$, $-0.76$, $-0.37$, 0.0, 0.36, 0.70, 1.02, 1.34, 1.64, 1.94, 2.50, and 3.52 dB, respectively.

The transmit frequency domain equalizer may employ tone binding in which multiple sub-carriers are grouped into zones and where each zone is scaled by a corresponding equalizer tap. In one embodiment for supporting an OFDM configuration with 52 sub-carriers, the transmit frequency domain equalizer includes twenty taps for a corresponding twenty zones in which a lower fourteen sub-carriers and an upper fourteen sub-carriers are bound two at a time and the middle twenty-four sub-carriers are bound four at a time into an inner six zones.

The transmit frequency domain equalizer may include a digital multiplier, a gain memory, gain select logic, multiple storage registers and tone select logic. The digital multiplier has a first input coupled to the output of the constellation map select, a second input for receiving selected gain values and an output coupled to the input of the IFFT processor. The gain memory stores multiple gain values and the gain select logic selects gain values from the gain memory. The storage registers stores a gain value for each tap as selected by the gain select logic. The tone select logic provides selected gain values to the second input of the digital multiplier. The gain select logic may be implemented with a multiplexer having a select input and multiple programmable registers that store corresponding gain select index values provide to the select input of the gain select logic. In this manner, the gain memory may store predetermined static gain values that are selected by gain index values provided within the programmable registers. The gain index values only need to include a sufficient number of bits to address a corresponding gain value from the gain memory. For example, if the gain memory stores sixteen (16) predetermined gain values, then each of the programmable registers need only include four bits for selecting a gain value.

A radio frequency (RF) communication device according to an embodiment of the present invention includes an RF transmitter and a Baseband processor. The RF transmitter includes transmit filtering that converts data packets into RF signals suitable for transmission via an antenna, where each data packet includes one or more symbols and each symbol incorporates multiple sub-carriers. The transmit filtering has a variant frequency response across a frequency range of the sub-carriers. The Baseband processor generates the data packets by incorporating data onto the sub-carriers of each symbol. The Baseband processor includes a transmit frequency domain equalizer with multiple taps for pre-compensating the sub-carriers for the variant frequency response of the transmit filtering. The transmit filtering includes transmit chain filtering of the radio portion and any other filtering of the RF communication device.

The RF communication device may be implemented according to many different embodiments. For example, the Baseband processor may include a constellation map select with multiple constellation maps for supporting multiple data rates. The constellation maps may include a 64 QAM constellation map that uses a selected normalization power gain that minimizes quantization distortion in a similar manner as previously described. The 64 QAM constellation map may have a maximum constellation point magnitude that does not exceed a predetermined bit resolution of an IFFT processor when multiplied by a maximum gain value of a digital multiplier of the transmit frequency domain equalizer. The transmit frequency domain equalizer may employ tone binding in which the sub-carriers are organized into zones in a similar manner as previously described.

The present invention contemplates a method of pre-compensating transmit filtering of a wireless transmitter in which the transmit filtering has a variant frequency response across a frequency range of multiple sub-carriers. The method includes providing a transmit frequency domain equalizer within a Baseband portion of the transmitter, determining a frequency response of transmit filtering of an RF portion of the transmitter across a frequency range of the sub-carriers, and programming taps of the transmit frequency domain equalizer to pre-compensate for the frequency response of transmit filtering. The method may further include providing a constellation map select with multiple constellation maps including a 64 QAM constellation map for supporting multiple data rates, and selecting constellation point magnitudes and normalization factors for each constellation map to maintain constant power across the constellation maps, e.g., so that the 64 QAM constellation map has constellation point magnitudes and a normalization factor that minimizes quantization distortion for 64 QAM. The Baseband portion of the transmitter may include an IFFT processor having a predetermined bit resolution. The method may further include selecting a maximum constellation point magnitude for the 64 QAM constellation and a maximum gain value magnitude for the transmit frequency domain equalizer to prevent exceeding the predetermined bit resolution of the IFFT processor. The method may further include tone binding multiple sub-carriers together for each tap of the transmit frequency domain equalizer to reduce a total number of taps. The method may include selecting gain values for the taps of the transmit frequency domain equalizer to maintain constant average power of the sub-carriers from input to output of the transmit frequency domain equalizer.

BRIEF DESCRIPTION OF THE DRAWINGS

A better understanding of the present invention can be obtained when the following detailed description of the preferred embodiment is considered in conjunction with the following drawings, in which:

FIG. 2A is a simplified block diagram of the transmit processing path of the RF transceiver of FIG. 1 illustrating operation of a preliminary transmit frequency domain equalizer (TX FEQ) implemented according to an embodiment of the present invention.

FIG. 2B is a simplified block diagram similar to FIG. 2A except excluding the transmit frequency domain equalizer to illustrate effects on the sub-carrier signals.

FIG. 5C is a block diagram of another exemplary embodiment of a transmit frequency domain equalizer using registers and select logic.

FIG. 10 is a flowchart diagram illustrating a method for calculating the transmitter equalizer taps for a transmit frequency domain equalizer employed in a wireless packet transmission system, such as OFDM or the like.

DETAILED DESCRIPTION OF EMBODIMENT(S) OF THE INVENTION

Figure 1:
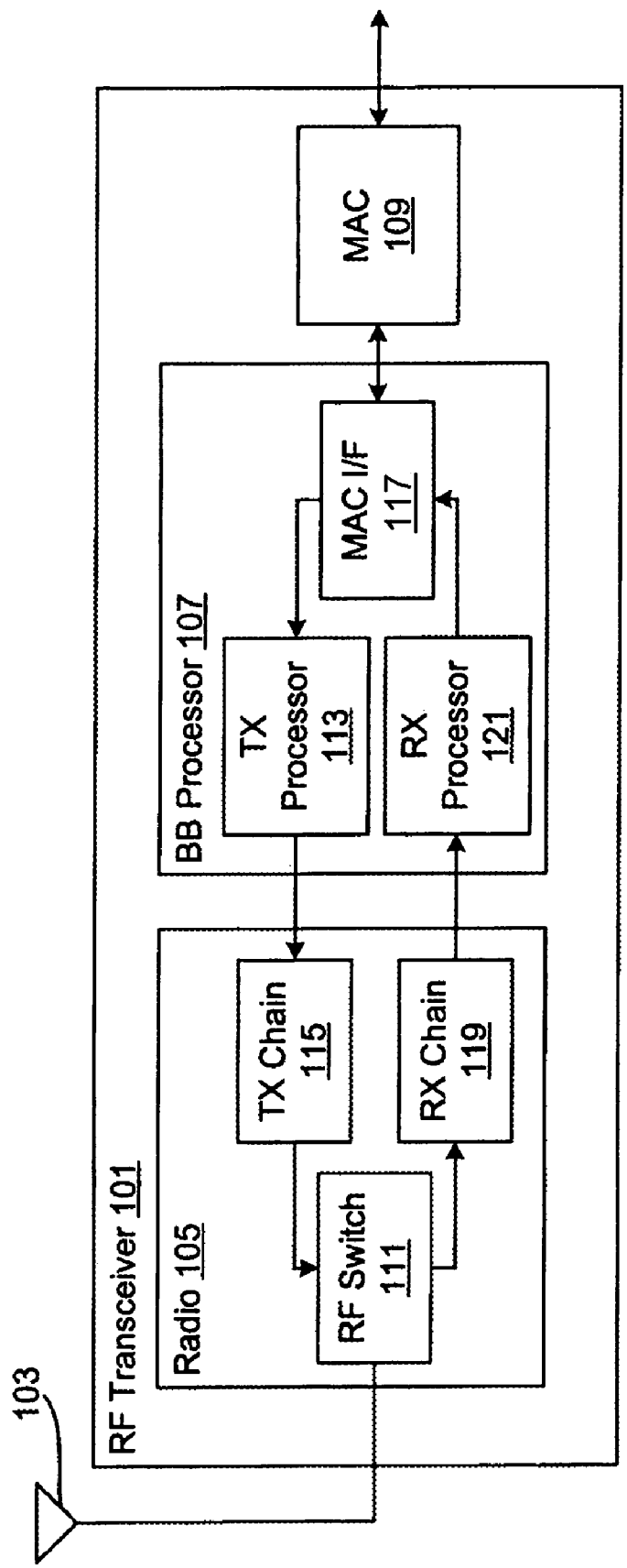
FIG. 1 is a block diagram of a wireless radio frequency (RF) transceiver implemented according to an embodiment of the present invention.

FIG. 1 is a block diagram of a wireless radio frequency (RF) transceiver 101 implemented according to an embodiment of the present invention. The RF transceiver 101 may be used to communicate with one or more similar wireless devices across a wireless medium, such as within a wireless local area network (WLAN) or the like. Although the present invention is illustrated for use in a WLAN device in exemplary embodiments, it is understood that the present invention applies to any radio or wireless communication device and is not limited to WLAN applications.

The RF transceiver 101 may be used by any type of device to incorporate wireless communication capabilities, such as a wireless access point (AP), any type of computer or computer system (e.g., personal computers, laptop computers, desktop computers, etc.), printing devices including any type of printer technology, personal digital assistants (PDAs) or the like, scanners, fax machines, etc. The RF transceiver 101 may be configured as a plug-in peripheral or expansion card that plugs into an appropriate slot or interface of a computer system, such as a Personal Computer Memory Card International Association (PCMCIA) card or PC Card or may be implemented according to any type of expansion or peripheral standard, such as according to the peripheral component interconnect (PCI), the Industry Standard Architecture (ISA), the Extended-ISA (EISA) standard, etc. Mini PCI cards with antennas embedded in displays are also contemplated. Self-contained or standalone packaging with appropriate communication interface(s) is also contemplated, which is particularly advantageous for APs. The RF transceiver 101 may be implemented as a separate unit with serial or parallel connections, such as a Universal Serial Bus (USB) connection or an Ethernet interface (twisted-pair, coaxial cable, etc.), or any other suitable interface to the device. Other types of wireless devices are contemplated, such as any type of wireless telephony device including cellular phones.

The RF transceiver 101 communicates via the wireless medium using one or more antennas 103 coupled to an internal radio chip or device 105. The radio 105 is coupled to a Baseband (BB) processor 107 that generally converts between RF signals and Baseband signals. The Baseband processor 107 is further coupled to a medium access control (MAC) device 109 that communicates with the underlying device or system. Digital data sent from or received by the RF transceiver 101 is processed through the MAC 109. For transmission, the MAC 109 asserts digital data signals via a MAC interface (I/F) 111 to a transmission (TX) processor 113, which formulates data into packets for transmission. The digital packet information is converted to analog signals using a digital to analog converter (DAC) 401 (FIG. 4) and processed by a TX chain 115 for converting the packets into RF signals suitable for transmission via the antenna 103. An RF switch 117 selects the TX chain 115 for transmission and an RF chain 119 for reception of packets. The RX chain 119 extracts Baseband signals from a received RF signal and provides the Baseband signals to a receive (RX) processor 121 via an analog to digital converter (ADC) (Not shown). The RX processor 121 generally performs the inverse functions of the TX processor 113 to extract data from received packets into data signals for the underlying device. The data is forwarded to the MAC 109 via the MAC I/F 111.

The RF transceiver 101 may be implemented according to the Institute of Electrical and Electronics Engineers, Inc. (IEEE) 802.11a standard operating at approximately 5 Gigahertz (GHz) for use within a WLAN. The IEEE 802.11a standard defines data rates of 6, 9, 12, 18, 24, 36, 48 and 54 megabits per second (Mbps) in the 5 GHz band employing orthogonal frequency division multiplexing (OFDM). OFDM is a multi-carrier modulation technique in which data is carried on a plurality of "tones" or "sub-carriers" associated with a multi-carrier signal. In the OFDM embodiment, communication is established using packets of information including one or more synchronization data fields followed by a plurality of OFDM symbols. In an OFDM configuration, 52 sub-carrier signals are incorporated within each OFDM symbol, including 48 data tones and 4 pilot tones as known to those skilled in the art. Data is incorporated on each data tone using a selected modulation scheme, such as Binary Phase Shift Keying (BPSK), Quadrature PSK (QPSK), 16 Quadrature Amplitude Modulation (QAM), and 64 QAM. Each of the modulation schemes employs a corresponding constellation map with 2, 4, 16 or 64 constellation points, respectively, for modulating 1, 2, 4 or 6 bits, respectively. The data rate is determined by the modulation scheme used for data. For example, BPSK is used for 6 or 9 Mbps, QPSK is used for 12 or 18 Mbps, 16 QAM is used for 24 or 36 Mbps, and 64 QAM is used for 48 or 54 Mbps. A constellation point is selected for each bit group according to the selected constellation map and data rate, and each tone is modulated with an amplitude and phase according to the selected constellation point. It is appreciated, however, that the teachings of the present invention may be applied in the same or similar manner to other types of wireless communication in which data is transmitted using a plurality of sub-carriers distributed in frequency and communicated via a selected RF band.

FIG. 2A is a simplified block diagram of the transmit processing path of the RF transceiver 101 illustrating operation of a preliminary transmit frequency domain equalizer (TX FEQ) 203 implemented according to an embodiment of the present invention. The components shown span the TX processor 113 and the TX chain 115. In particular, the TX FEQ 203 and an Inverse Fast-Fourier Transform (IFFT) processor 207 are within the TX processor 113 and a subsequent TX filter 209 represents processing within the TX chain 115.

A plurality of tones or sub-carrier signals 201 are shown provided to the input of the TX FEQ 203. The sub-carrier signals 201 are shown as generally flat and can be considered test tones for clearly illustrating the effects of the TX FEQ 203 and the subsequent transmit filtering. Actual sub-carrier signals during normal operation may have variant amplitudes and phases when modified by data incorporated thereon. The TX FEQ 203 equalizes the sub-carrier signals 201 resulting in a corresponding plurality of equalized sub-carrier signals 205 at its output, shown with variant amplitudes resulting from the equalization process. The equalized sub-carrier signals 205 at the output of the TX FEQ 203 are then provided to the input of the IFFT processor 207, which converts the sub-carrier signals from the frequency domain to the time domain for processing by the TX chain 115.

The transformed sub-carrier signals are processed through the DAC 401 and eventually provided to the TX chain 115 within the TX filter 209, which incorporates various filtering and processing functions for preparing the equalized and transformed sub-carrier signals for transmission via a wireless medium. The DAC 401 causes zero-order hold (ZOH) distortion and quantization errors or distortion. The TX filter 209 includes sources of distortion including one or more low pass filters (LPFs) and SAW filters. The combined effect of the sources of distortion is illustrated by a frequency response curve 211 shown above the TX filter 209 as applied to the frequency span of the sub-carrier signals. It is appreciated that the frequency response is not flat and causes a variant effect on each of the sub-carrier signals. The combined filter response may otherwise violate spectral mask requirements and degrade packet error rate (PER) performance of the transmitter.

The TX FEQ 203, however, is designed to pre-compensate the sub-carrier signals for the combined filter response illustrated by the frequency response curve 211 of the TX filter 209. Such pre-compensation operates to negate the combined filter response of the TX filter 209, so that the spectrum of the resulting output sub-carrier signals 213 are once again generally flat. FIG. 2B is a simplified block diagram similar to FIG. 2A except excluding the TX FEQ 203 to illustrate effects on the sub-carrier signals without the TX FEQ 203. The output sub-carrier signals 215 of the TX filter 209 are variant and not flat when the TX FEQ 203 is excluded, and generally follow the frequency response curve 211 of the TX filter 209. The TX FEQ 203 includes a plurality of taps that may be programmed based on the combined frequency response of the TX filter 209. For example, the FEQ taps may be based on the inverse frequency response of the TX filter 209 in order to negate its non-uniform effects. Although a primary impairment to frequency response is the frequency ripple due to SAW filters of the TX filter 209, it is noted that the TX FEQ 203 may compensate for transmit path portions of the RF transceiver 101 as a while and not just the TX filter 209, such as, for example, frequency domain impairments in the Baseband processor 107 and any external components used to provide filtering and impedance matching.

Figure 3:
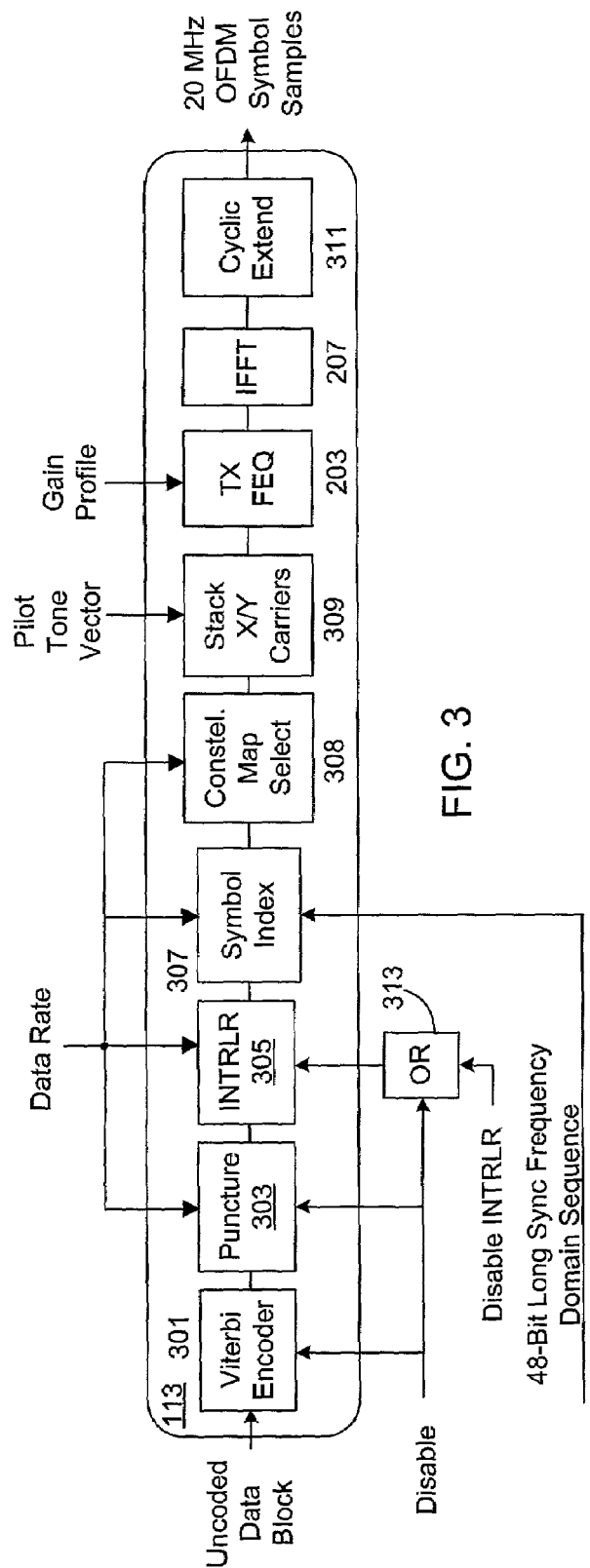
FIG. 3 is a more detailed block diagram of the TX processor of FIG. 1 including an OFDM symbol generator according to an embodiment of the present invention.

FIG. 3 is a more detailed block diagram of the TX processor 113 including an OFDM symbol generator according to an embodiment of the present invention. In general, the OFDM symbol generator incorporates data onto multiple sub-carriers of each OFDM symbol, where each data packet includes one or more OFDM symbols. In the embodiment shown, uncoded binary data blocks from the MAC 109 are provided to a Viterbi encoder 301, which incorporates redundant data such as error correction codes (ECC) or the like. The output of the Viterbi encoder 301 is coupled to a puncture block 303, which removes some of the bits of redundant information to increase the effective data rate if necessary. The output of the puncture block 303 is coupled to a interleaver block (INTRLR) 305, which scrambles blocks of digital data according to a predetermined block interleave algorithm. The output of the interleaver block 305 is coupled to a symbol index block 307, which groups one or more bits of data according to the selected data rate. The output of the symbol index block 307 is provided to a constellation map select 308, which selects a constellation map which maps the data to one of multiple constellation points according to the selected constellation map and data rate. The symbol index block 307 also applies a normalization power gain (K) to each of the constellation points according to a Kmod function to normalize the average power of each constellation type to 1 according to recommendations of the 802.11a specification. A different gain (K) is applied for each constellation type to normalize average power. In one embodiment, for example, the 64 QAM constellation map uses K=1/sqrt(42), the 16 QAM constellation map uses K=1/sqrt(10), the QPSK constellation uses K=1/sqrt(2), and the BPSK constellation map uses K=1, where "sqrt" denotes the square root function. A problem with this configuration is that quantizing the 64 QAM constellation map using K=1/sqrt(42) introduces significant quantization distortion at the highest data rate, which has the least tolerance for such distortion.

The data rate is selected by a Data Rate signal, which is provided to the puncture block 303, the interleaver block 305, the symbol index block 307 and the constellation map select 308. In an OFDM embodiment, for example, a BPSK constellation map is used for data rates of 6 or 9 Mbps, a QPSK constellation map is used for 12 or 18 Mbps, a 16 QAM constellation map is used for 24 or 36 Mbps, and a 64 QAM constellation map is used for 48 or 54 Mbps.

The output of the constellation map select 308 is coupled to an X/Y stack block 309, which adds pilot tone vectors to the data tones and which maps the data tones within the 64 sub-carriers of the IFFT processor 207. In the OFDM embodiment, the 52 sub-carrier signals (X=52) or tones (48 data tones, 4 pilot tones) are centered within the 64 IFFT sub-carriers (Y=64) on either side of the middle sub-carrier, which is left blank or set to zero. The components to this point may collectively be referred to as a data modulator that incorporates data bits onto the sub-carriers according to a selected data rate. The output of the stack block 309 of the data modulator is coupled to the TX FEQ 203, which equalizes the signals as further described below. The output of the TX FEQ 203 is coupled to the IFFT processor 207 as previously described. The output of the IFFT processor 207 is coupled to a cyclic extend block 311, which asserts OFDM symbol samples at 20 MHz at its output.

The interleaver block 305 is selectively disabled by assertion of either a Disable signal or a Disable INTRLR signal, each provided to respective inputs of a two-input OR logic block 313. The Viterbi encoder 301, the puncture block, 303 and the interleaver block 305 are disabled by the Disable signal for transmitting a 48-bit Long Sync Frequency Domain Sequence. The Long Sync sequence is used as a training sequence by the receiver, as known to those skilled in the art.

Figure 4:
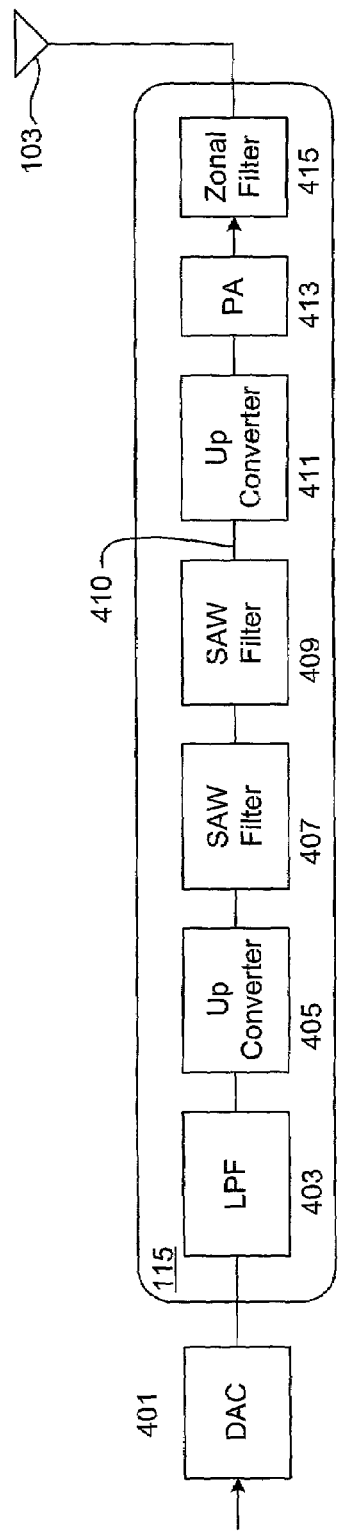
FIG. 4 is a more detailed block diagram of the TX chain of FIG. 1 illustrating TX filtering with variant frequency response.

FIG. 4 is a more detailed block diagram of the TX chain 115 illustrating TX filtering with variant frequency response. The OFDM symbols are converted to analog format by the DAC 401 and provided to a low pass filter (LPF) 403 within the TX chain 115. The signal is then processed through several levels of conversions and filtering, including a pair of up converters 405, 411 and a pair of SAW filters 407, 409. The processed signal is provided to a power amplifier (PA) 413 and then to a Zonal filter 415 for assertion on the antenna 103 for transmission. It is appreciated that the TX filter 209 represents the processing, conversions and filtering in the TX chain 115 having a variant frequency response as represented by curve 211. The TX FEQ 203 pre-compensates for this variant frequency response.

Figure 5A:
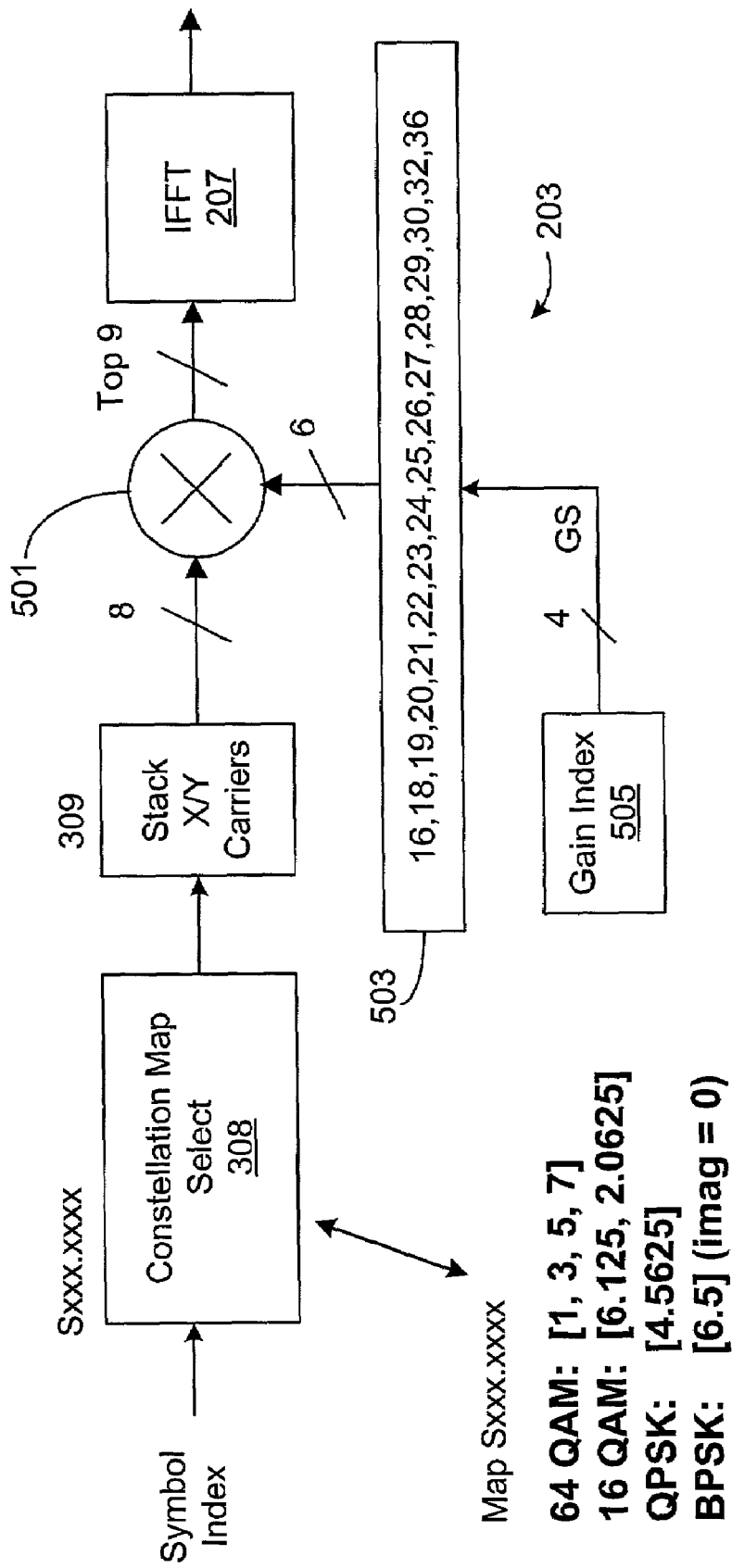
FIG. 5A is a block diagram illustrating configuration and operation of the constellation map select of FIG. 3 and the transmit frequency domain equalizer according to an embodiment of the present invention.

FIG. 5A is a block diagram illustrating configuration and operation of the constellation map select 308 and the TX FEQ 203 according to an embodiment of the present invention. The symbol index block 307 provides a Symbol Index to the constellation map select 308, which outputs 8-bit binary values having the format Sxxx.xxxx to the stack block 309. It is desired to control the power levels through the transmitter including the TX processor 107 and the TX FEQ 203. The PA 413 boosts the power of the output signal to a sufficiently high power level to achieve the desired range of transmission while maintaining signal integrity. Since the PA 413 has a relatively high gain range, it is sensitive to input power levels, which should remain within a relatively narrow gain range. Although it is possible to add sophisticated power control to maintain the input power level of the PA 413, such would overly complicate transmitter design and lead to instability and/or loss of signal sensitivity. Therefore, it is preferred to normalize the power through the transmitter components in order to stabilize power levels and simplify transmitter design.

The Kmod function is modified to normalize each constellation map to have approximately the same average power and to minimize or otherwise eliminate quantization distortion that would otherwise occur for the 64 QAM constellation map. The BPSK, QPSK and 16 QAM constellation maps used for lower data rates are implemented with some quantization distortion; the lower data rates, however, are more robust and are able to tolerate higher levels of distortion as compared to 64 QAM. In particular, the constellation map points for 64 QAM are selected as ±1, ±3, ±5 and ±7 and the Kmod function gain is K=1. The 64 QAM constellation points convert to binary representations of S001.0000, S011.0000, S101.0000 and S111.0000, respectively, where "S" denotes a sign bit (0 binary for positive and 1 binary for negative). The constellation points for 16 QAM are ±6.125 and ±2.0625 and the Kmod function gain is K=2.0625. The 16 QAM constellation points convert to binary representations of S110.0010 and S010.0001, respectively. The constellation points for QPSK are ±4.5625 and the Kmod function gain is K=4.5625. The QPSK constellation points convert to a binary representation of S100.1010. The constellation point for BPSK is ±16.5 and the Kmod function gain is K=6.5. The BPSK constellation points convert to a binary representation of S110.1000 where the imaginary portion is zero.

Each 8-bit Sxxx.xxxx value is provided through the stack block 309 and to one input of a digital multiplier 501. A memory 503, such as a set of static or programmable registers or the like, stores a set of predetermined gain values. A gain index 505 asserts a gain select signal GS to the memory 503 for selecting gain values. A selected gain value from the memory 503 is provided to a second input of the digital multiplier 501, so that each output of the constellation map select 308 is multiplied by a selected gain value. The output of the multiplier 501 is provided to the input of the IFFT processor 207. In the embodiment shown, the IFFT processor 207 has a 9-bit input, so that the top or most significant bits (MSBs) at the output of the multiplier 501 is selected. The number of bits of the input of the IFFT processor 207 determines its relative bit resolution. Each constellation point of each symbol may be multiplied by a separate selected gain value from the memory 503 or the tones are grouped into zones.

It may be desired to limit the number of gain values to limit the size of the memory 503. Also, reducing the number of gain values limits the number of bits for the GS signal used to select the gain values. In the embodiment shown, 16 different gain values are employed so that the gain signal GS is 4 bits. The relative size of the gain values chosen is somewhat arbitrary. It is desired, however, to reduce or otherwise eliminate quantization errors associated with the modulation scheme 64 QAM employed for the highest data rates. Since the input to the IFFT processor 207 is limited to 9 bits including a sign bit, it is desired that the maximum value not exceed ±255. Further, since the largest constellation point for 64 QAM is 7, it is desired that the highest gain value not exceed 36 since 36<255/7<37. Therefore, the maximum gain value is arbitrarily chosen as 36.

It is further desired that the gain between minimum or maximum and a selected nominal gain value not exceed 4 decibels (dB) to meet the specifications provided IEEE 802.11a standard for an OFDM embodiment. The nominal "nom" gain value in dB is determined so that $20*\log_{10}(max/nom)$ is less than or equal to 4 dB, where the "max" gain value is 36 and the asterisk (*) denotes multiplication. Using this equation a nominal gain value of 24 is determined, where $20*\log_{10}(36/24)=3.5$ dB. To achieve a high degree of symmetry, it is determined that the minimum "min" gain value result in a dB gain differential of approximately −3.5 dB. In this manner, the minimum gain value is determined by the equation 36/24=24/min, so that the "min" gain value is equal to 16. The remaining gain values between min=16 and nom=24 and between nom=24 and max=36 are chosen to achieve a relatively high degree of symmetry. In one embodiment, the 16 gain values are selected as 16, 18, 19, 20, 21, 22, 23, 24, 25, 26, 27, 28, 29, 30, 32 and 36, corresponding to dB gain values of −3.52, −2.49, −2.03, −1.58, −1.16, −0.76, −0.37, 0.0, 0.36, 0.70, 1.02, 1.34, 1.64, 1.94, 2.50, and 3.52 dB, respectively.

Figure 5B:
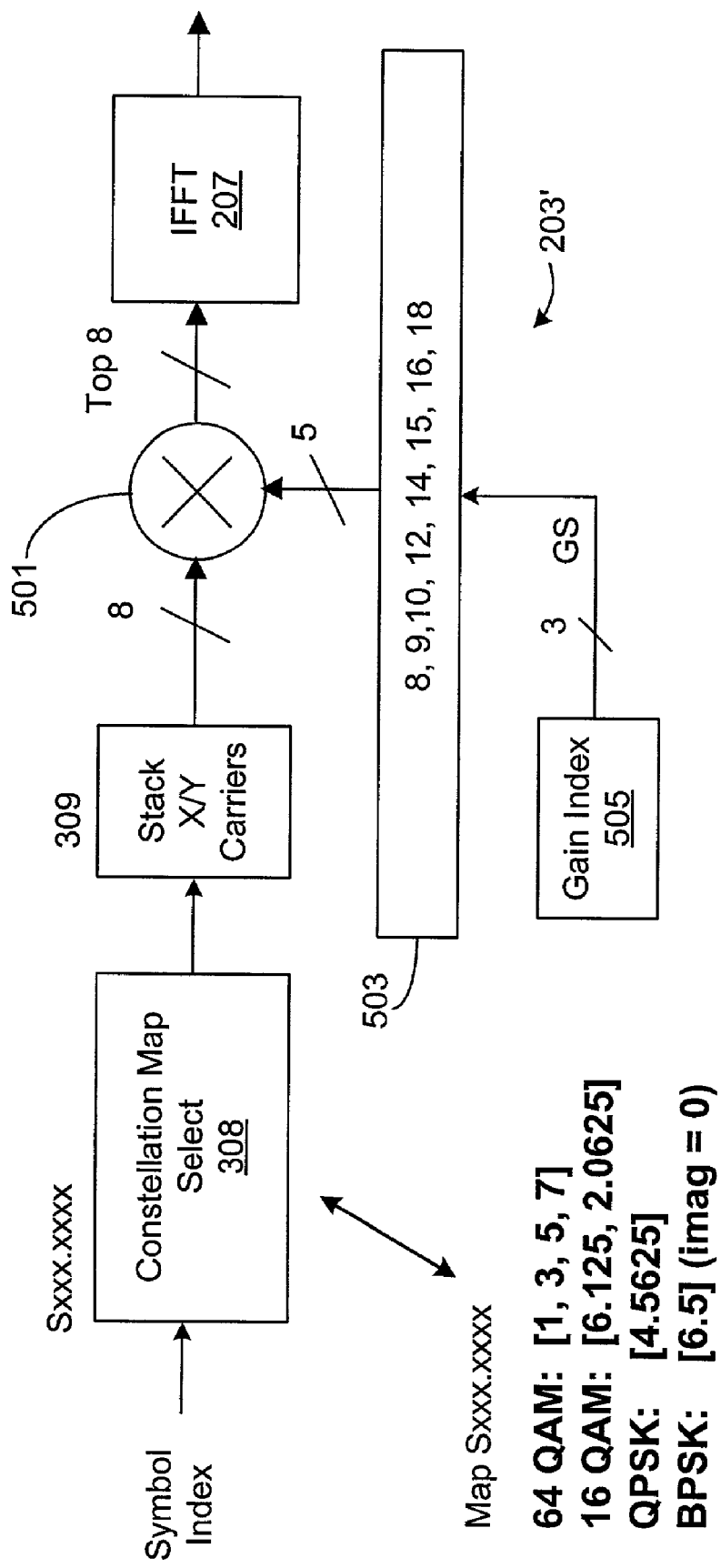
FIG. 5B is a block diagram illustrating configuration and operation of the constellation map select of FIG. 3 and the transmit frequency domain equalizer according to an alternative embodiment of the present invention.

FIG. 5B is a block diagram illustrating configuration and operation of the constellation map select 308 and the TX FEQ 203 according to an alternative embodiment of the present invention. In this configuration, operation is similar except that the number of bits at the input of the IFFT processor 207 is limited 8 bits. The number of gain values is limited to 8 values, such as 8, 9, 10, 12, 14, 15, 16 and 18 selected based on similar considerations as previously described. The corresponding to dB gain values are −3.52, −2.50, −1.58, 0.0, 1.34, 1.94, 2.50, and 3.52, respectively. Each gain index requires only 3 bits for selecting a gain value.

The taps of the TX FEQ 203 may be static values or may comprise programmable taps with pre-programmed values. Transmit filtering components may vary from unit to unit so that each unit has a different frequency response. In one embodiment, the total frequency response of the TX filter 209 and any other filtering is measured during manufacturing and the FEQ taps are programmed accordingly. For an OFDM embodiment with 52 sub-carrier signals for each OFDM symbol, for example, the TX FEQ 203 may include 52 pre-programmed taps or 52 programmable taps with pre-programmed values. After measurement, the taps may be programmed to a static value that are not changes. One issue with static values, however, is that the TX FEQ 203 may be located on a separate integrated circuit (IC) or chip incorporating the Baseband processor 107 while the TX chain 115 incorporating the TX filter 209 is located on a separate IC incorporating the radio 105. If it is desired to manufacture and sell the Baseband processor 107 separately for use with a different radio, then the TX FEQ 203 taps should be programmable for compatibility with different radio units.

A different digital combiner or multiplier could be used to implement each tap to properly modify the corresponding sub-carrier signal. Digital multipliers, however, consume an appreciable amount of IC space so that a separate tap for each sub-carrier signal would result in a relatively complicated and potentially costly design. Instead, the data may be serially shifted through the single digital multiplier 501, which receives a corresponding gain value at its other input and outputs a corresponding modified tone value. Another issue is the size and addressing of the programmable registers employed to store the gain values for each tone. It is possible to provide 52 programmable registers, each having a sufficient number of bits to achieve any level of accuracy. It is desired, however, to limit the size and number of all elements on the chip, including programmable memories, to achieve as high a degree of efficiency as possible while maintaining a sufficient level of accuracy. A solution is to limit the range of the gain values to limit the size of corresponding registers or other memory storing the gain values. Additionally, the number of gain values may be limited to limit the number of registers or memories required for storing the gain values and also reducing the number of address bits needed to access each gain value.

Furthermore, the gain values themselves may be static values so that the memory 503 need not be programmable, which significantly simplifies the FEQ design. Instead of programming gain value registers, the gain index 505 includes programmable index registers, in which one gain index value is provided for each FEQ tap for selecting the corresponding gain value for that tap. For the TX FEQ 203 configuration shown in FIG. 5A with the GS signal having 4 bits, the gain index 505 includes a set of programmable registers each having at least 4 bits for storing a gain index for each tap of the TX FEQ 203. For the TX FEQ 203 configuration shown in FIG. 5B with the GS signal having 3 bits, the gain index 505 includes a set of programmable registers each having at least 3 bits for storing a gain index for each tap of the TX FEQ 203. In this manner, the size and number of programmable registers is substantially reduced to simplify implementation complexity.

FIG. 5C is a block diagram of another exemplary embodiment of the TX FEQ 203 using registers and select logic. The gain values are permanently stored in a memory 507 and provided to a multiplexer (MUX) 509. Gain select logic selects the gain values from the memory 507 to storage registers 513. In the embodiment shown, the gain select logic includes programmable registers 511 that assert gain address values to select inputs of the MUX 509 for providing selected gain values to the storage registers 513. The storage registers 513 provide the selected gain values for each zone to tap select logic or a zone MUX 515. The zone MUX 515 asserts one gain value to the multiplier 501 at the appropriate time for each zone of each OFDM symbol as controlled by select signals SEL provided to select inputs of the MUX 515. Of course, if tone binding is not employed, then the zone MUX 515 is replaced by tone select logic tat asserts one gain value for each tone.

Figure 6:
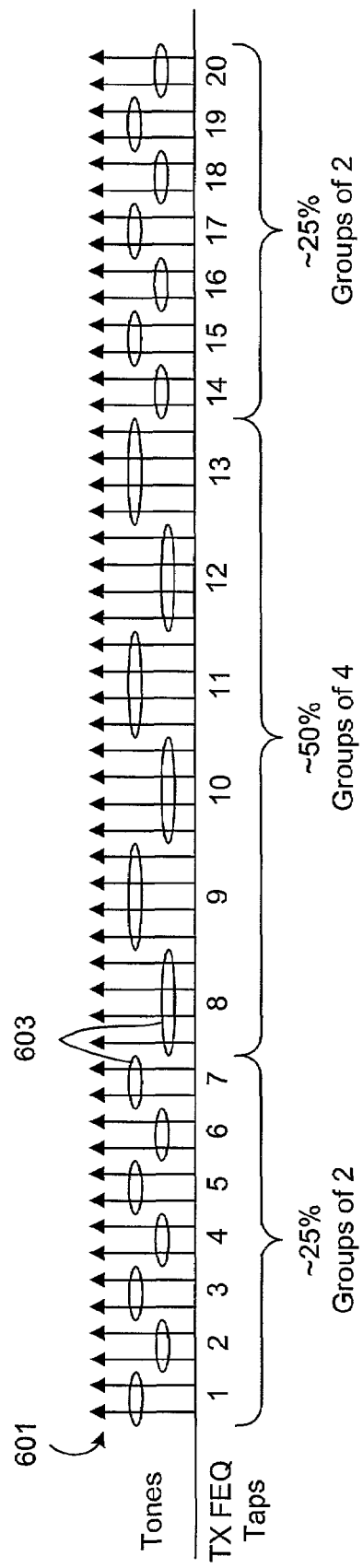
FIG. 6 is a figurative diagram illustrating tone gain binding according to an OFDM embodiment of the present invention which employs 52 tones.

FIG. 6 is a figurative diagram illustrating tone gain binding according to an OFDM embodiment of the present invention which employs 52 tones. The tones 601 are illustrated with arrows mapped along a straight line. Ellipses 603 are shown wrapped around tones that are bound together into corresponding zones for purposes of compensation or equalization by a corresponding tap of the TX FEQ 203. As shown, the first and last 25% portions of the tones are grouped together by twos and the middle 50% of tones are grouped together by fours. In particular, the first and last 14 tones are grouped together by twos and the middle 24 tones are grouped together by four resulting in a total of 20 zones. Since the tones are distributed in frequency, the "outer" tones at the lowest and highest frequency levels are grouped with higher granularity (less tones per zone) to enable more accurate compensation to filters roll-off at the low and high frequencies. Alternative tone binding configurations are contemplated. For example, the tones may all be bound 2 at a time or 4 at a time to reduce the number of taps from 52 to 26 or 13, respectively.

Each group or zone corresponding to a tap of the TX FEQ 203, so that 20 zones result in only 20 taps thereby reducing implementation complexity. The gain index 505, for example, may include one programmable gain index value for each of the 20 zones. Separate select logic (not shown) is employed to select the appropriate gain index value for each tone applied to the multiplier 501. For an OFDM embodiment, 52 tones are synchronized with 20 gain values through the multiplier 501.

Figure 7:
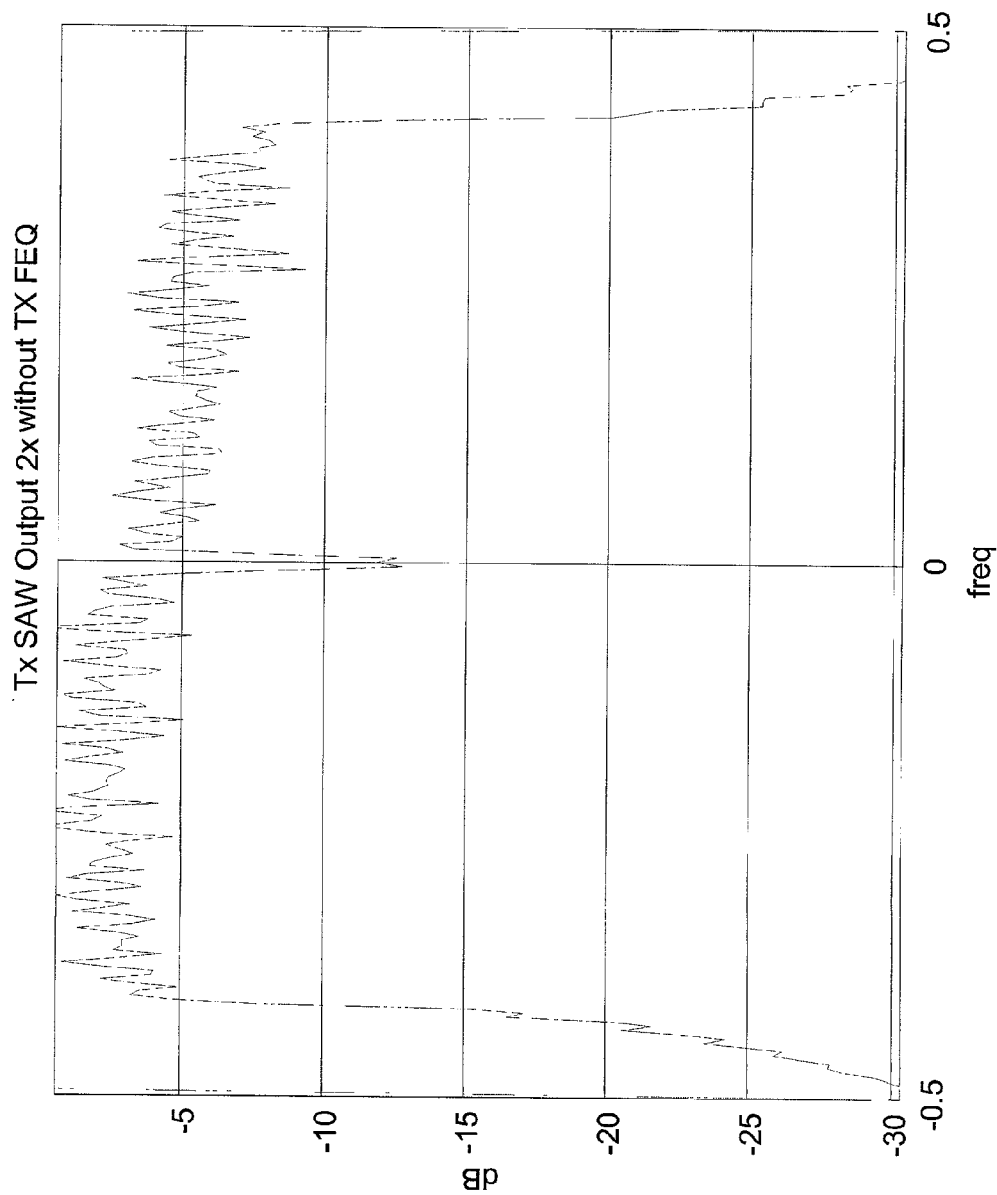
FIG. 7 is a graph diagram illustrating power spectrum at the output of the SAW filter of FIG. 4 in decibels versus normalized frequency (freq) across the tones of an OFDM configuration without a transmit frequency domain equalizer.

FIG. 7 is a graph diagram illustrating power spectrum at the output 410 of the SAW filter 409 in dB versus normalized frequency (freq) across the tones of an OFDM configuration without a transmit frequency domain equalizer. The power spectrum is clearly not flat and drops by several dB at higher frequencies.

Figure 8:
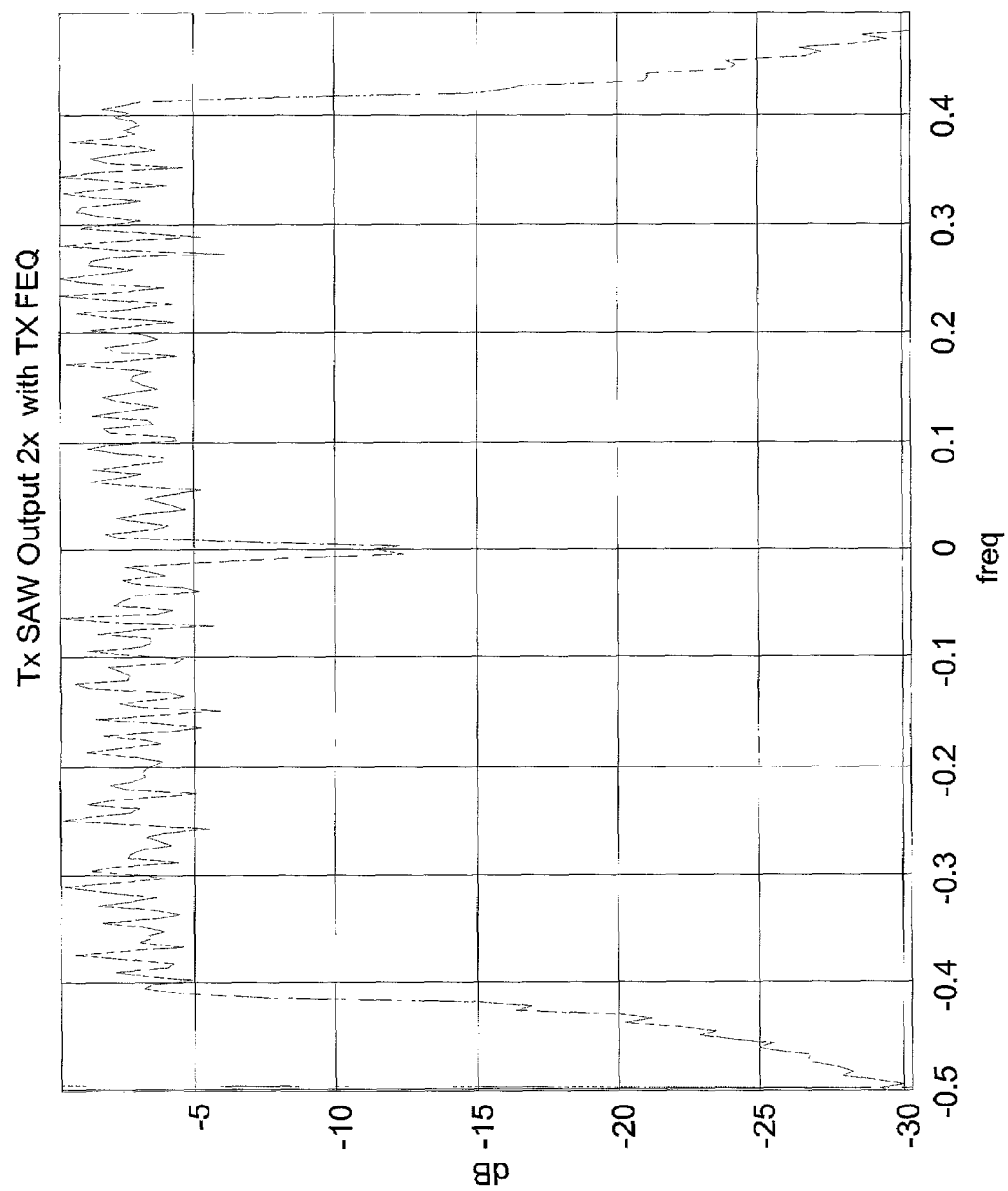
FIG. 8 is a graph diagram illustrating power spectrum at the output of the SAW filter of FIG. 4 in decibels versus normalized frequency (freq) across the tones of an OFDM configuration using a transmit frequency domain equalizer. system employing a transmit frequency domain equalizer.

FIG. 8 is a graph diagram illustrating power spectrum at the output 410 of the SAW filter 409 in dB versus normalized frequency (freq) across the tones of an OFDM configuration using a transmit frequency domain equalizer such as the TX FEQ 203. The power spectrum is clearly level across the entire frequency range of the tones.

Figure 9:
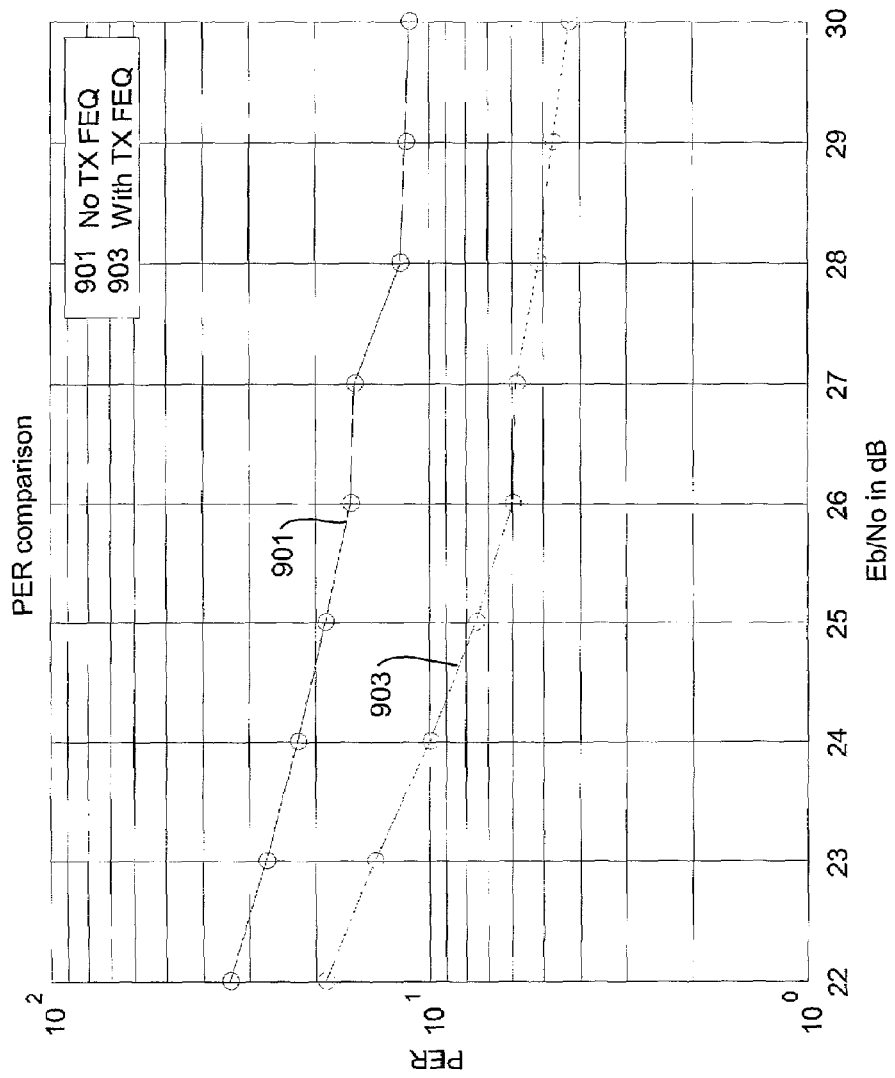
FIG. 9 is a graph diagram plotting packet error rate (PER) versus energy per bit versus noise, or "Eb/No" in decibels for operation at a data rate of 54 Mbps for PER comparison of ra system employing a transmit frequency domain equalizer.

FIG. 9 is a graph diagram plotting packet error rate (PER) versus energy per bit versus noise, or "Eb/No" in dB for operation at a data rate of 54 Mbps for PER comparison for a system employing a transmit FEQ, such as one similar to the TX FEQ 203. A simulation was conducted at 54 Mbps using 1,000 bytes per packet and 2000 packets with PA BO=8.5 dB, MP=100 ns, FO=20 PPM and PN=2 degrees. The upper line 901 is a plot for a system without a transmit frequency domain equalizer and the lower line 903 is a plot for a system using a transmit frequency domain equalizer in accordance with an embodiment of the present invention. It is clear that a system employing a transmit frequency domain equalizer according to an embodiment of the present invention has improved PER performance.

As referenced previously, it is desired that the tones before and after the TX FEQ 203 have approximately the same average power. The taps of the TX FEQ 203 may be pre-programmed at time of manufacture by pairing a Baseband processor 107 with a radio 105 and measuring the overall transmit filter frequency response. In one embodiment, a set of test tones 201 is applied at the input with the TX FEQ 203 omitted, bypassed or otherwise set to 0 dB for all taps, and the frequency response is measured at a point prior to wireless transmission, such as at the output 410 of the SAW filter 409. The goal is to program the taps of the TX FEQ 203 to compensate for the overall frequency response so that the output tones are as flat as possible while also maintaining constant average power through the TX FEQ 203. One way to do this is to make a measurement of the frequency response, adjust the taps according to the inverse of the frequency response, and then further adjust one or more taps maintain the sum of the dB differentials to zero. For example, for every tap this adjusted up 1 dB, another tap is adjust down by 1 dB to maintain the sum at or as close to zero as possible. Optimally, of course, it is desired to automate the process to expedite the manufacturing process.

Figure 10:
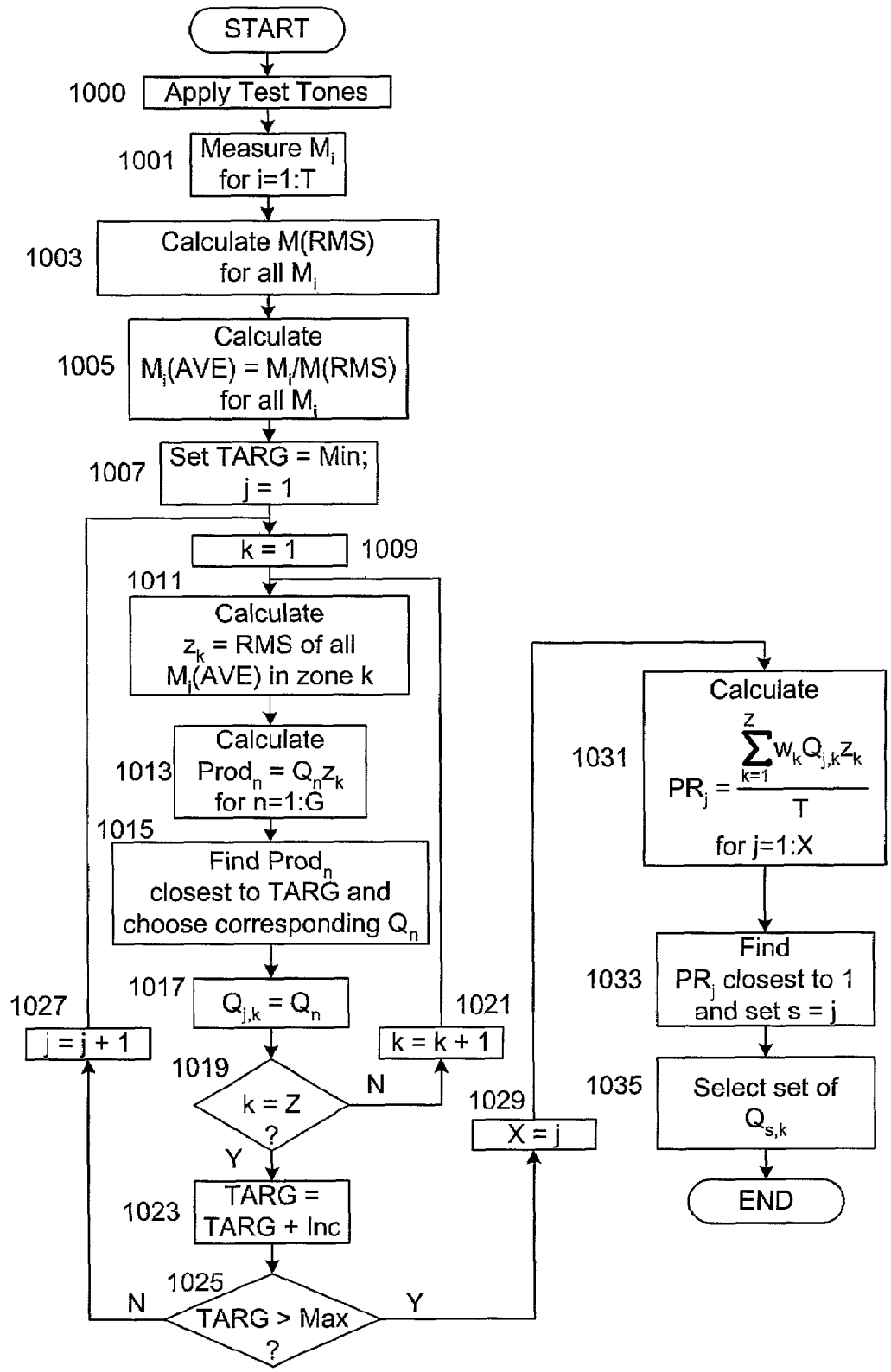

FIG. 10 is a flowchart diagram illustrating a method for calculating the transmitter equalizer taps for a transmit frequency domain equalizer 203 employed in a wireless packet transmission system, such as OFDM or the like. At first block 1000, test tones, such as incorporated within test symbols or the like, are applied through the TX filter 209 of the TX chain 115 of the radio 105. The test tones should include all of the sub-carriers at the requisite frequencies and should be as equal or as flat as possible for proper measurement. The test tones may be applied directly to the radio 105 or may be generated by the Baseband processor 107 using test data or the like. If the Baseband processor 107 is employed, then the TX FEQ 203 of the TX processor 113 should be pre-programmed with zero dB gains to ensure proper measurement. The test tones may be generated by the Baseband processor 107 by transmission of constant random data.

At next block 1001, the output magnitudes $M_i$ at the centers of all of the sub-carriers are measured, such as at the output of the radio 105 or at the output 410 of the SAW filter 409 prior to the PA 413 or at any other convenient location. The magnitudes $M_i$ are indexed using index value "i" ranging from 1 to "T", where T denotes the total number of sub-carriers or tones. For OFDM, T=52. At next block 1003, the RMS value for all of the magnitudes $M_i$ is calculated, referred to as M(RMS). At next block 1005, each of the magnitudes $M_i$ are normalized by the RMS value M(RMS) so that the average power of all of the normalized magnitudes $M_i(AVE)$ is equal to 1. At next block 1007, a variable "TARG" is initialized to a value "Min" and an index variable "j" is initialized to 1. The variable TARG is intended to have a nominal value of about 1, except that it is not initially set to exactly 1. Instead, TARG is set to an arbitrary limit value "Min" below 1 and is incremented by an incremental value "Inc" to another arbitrary limit value "Max" above 1. For example, if Min=0.9, Max=1.1 and Inc=0.005, then TARG begins with a value 0.9 and is incremented within a loop by 0.005 until it exceeds 1.1 (e.g., TARG=0.9, 0.905, 0.91, 0.915, ..., 1.085, 1.09, 1.095, 1.1 for respective iterations of the loop). The index variable j is incremented with each increment of TARG value to track the total number of increments between Min and Max. For the example above, TARG is incremented 40 times between 0.9 and 1.1 with 0.005 increments so that j increments from 1 to 40. The ending value of j depends upon on the limit values Min and Max and the incremental value Inc, which may be arbitrarily determined.

After block 1007, operation proceeds to block 1009 in which another index variable "k" is initialized to 1. The variable k is a zone variable that is incremented between 1 and "Z", where Z denotes the total number of zones. For an OFDM tone binding arrangement as described herein with the outer 25% tones on both sides are bounded two tones at a time and the inner tones are bounded 4 at a time for 52 total zones, Z=20. At next block 1011, an average zone power value "$z_k$" is calculated, which is the RMS value of all of the normalized magnitudes $M_i$(AVE) within a given zone k. In effect, the normalized tone magnitudes within each zone are averaged. At next block 1013, a set of values "$Prod_n$" are calculated as $Q_n$ times $z_k$ using in index variable "n" that is incremented from 1 to a value "G". The values $Q_n$ include the gain values determined as described previously and the value G denotes the total number of gain values. For the TX FEQ 203 shown in FIG. 5A, the index n increments by 1 from 1 to 16 corresponding to each of the gain values. At next block 1015, the $Prod_n$ values are compared to TARG and the closest value is selected. The corresponding set of gain values (taps) $Q_n$ is chosen. It is noted that there are many methods of performing the operations of blocks 1013 and 1015 and it may not be necessary to step through all of the gain values.

At next block 1017, the $Q_n$ gain value chosen in block 1015 is set equal to a value $Q_{j,k}$, where the indexes j and k are employed to reference specific gain values within a matrix of gain values of size jxk. At next decision block 1019, the index k is compared with the value Z to determine whether all zones have been processed for the current value of j. If not, operation proceeds block 1021 in which the index k is incremented, and then operation returns to block 1011. In this manner, operation loops between blocks 1011 and 1019 until a gain value $Q_{j,k}$ is determined all of the Z zones for the given value of TARG, resulting in an array of gain values $Q_{1,1}$, $Q_{1,2}$, ..., $Q_{1,z}$ corresponding to the current value of TARG denoted by the index j. After k is incremented to Z completing the first array of the values of the gain matrix, operation proceeds to block 1023 in which the value TARG is incremented by Inc as previously described. The incremented value TARG is then compared to Max at next decision block 1025 to determine if the gain matrix is completed. If TARG does not yet exceed Max, then operation proceeds to next block 1027 to increment the index j, and operation returns to block 1009 to re-initialize the index value k back to 1.

In this manner, the inner loop of blocks 1011 to 1019 is repeated again to determine another array of gain values $Q_{2,1}$, $Q_{2,2}$, ..., $Q_{2,Z}$ for j=2 to complete a second array or row of the gain matrix $Q_{j,k}$. The outer loop terminates when the value TARG increments to exceed the upper limit value Max. When this happens, the gain matrix $Q_{j,k}$ is completed for all values of j and k. Each row of the gain matrix, denoted by j, corresponds to a particular TARG value and includes a set of k gain values that may be programmed as the taps of the TX FEQ 203. As described further below, each array of gain values are examined to identify the set of gains that most closely meet the average power and equalization parameters for the transmit frequency domain equalizer. In an alternative embodiment, the TARG value may initially be set to 1 and a single iteration performed to determine a set of gain values. It is possible, however, that a single iteration conducted in this manner would result in a set of gains that may not achieve the same average power from input to output (unity gain) of the transmit frequency domain equalizer. Nonetheless, the set of gains would be reasonably close and the RF transceiver 101 would most likely operate in a suitable manner. However, it may be desired to achieve the optimal solution in an automated manner. Unity power gain can be calculated in the frequency domain by integrating the power of the discrete frequency response.

Operation proceeds from block 1025 to block 1029 if TARG is greater than Max, and a value "X" is set equal to j to store the number of gain value sets to evaluate. Operation then proceeds to block 1031 in which an array of power ratio values PRj are calculated according to the equation shown. The increment value is incremented by 1 from 1 to X for each array of gain values. In particular, each $Q_{j,k}$ gain value for a given value of j is multiplied by the corresponding average power value $z_k$ and a corresponding weight factor "$w_k$" and summed together for each k incremented by 1 from 1 to the number of zones Z. The resulting sum is divided by the total number of tones T. The weight factors $w_k$ may correspond to the number of tones within each zone to normalize the differential power contribution of each zone in the sum (integration). For example, zones with 2 tones bound together have a weight factor of 2 and zones with 4 tones bound together have a weight factor of 4, and so on. The resulting power ratio value $PR_j$ represents the power ratio from input to output of the TX FEQ 203 for the corresponding array of gain values $Q_{j,k}$. In this manner, an array of X power ratios $PR_j$ are determined, each corresponding to a set of gain values.

At next block 1033, the PRj power ratio value closest to one is selected. The selected power ratio value corresponds to the set of gain values that result in the smallest power differential between the input and output of the TX FEQ 203. A variable "s" is set equal to the index j of the selected $PR_j$ value. At next block 1035, the corresponding set of gain values $Q_{s,k}$ are selected as the optimal choice to achieve the desired parameters for the TX FEQ 203.

Figure 11:
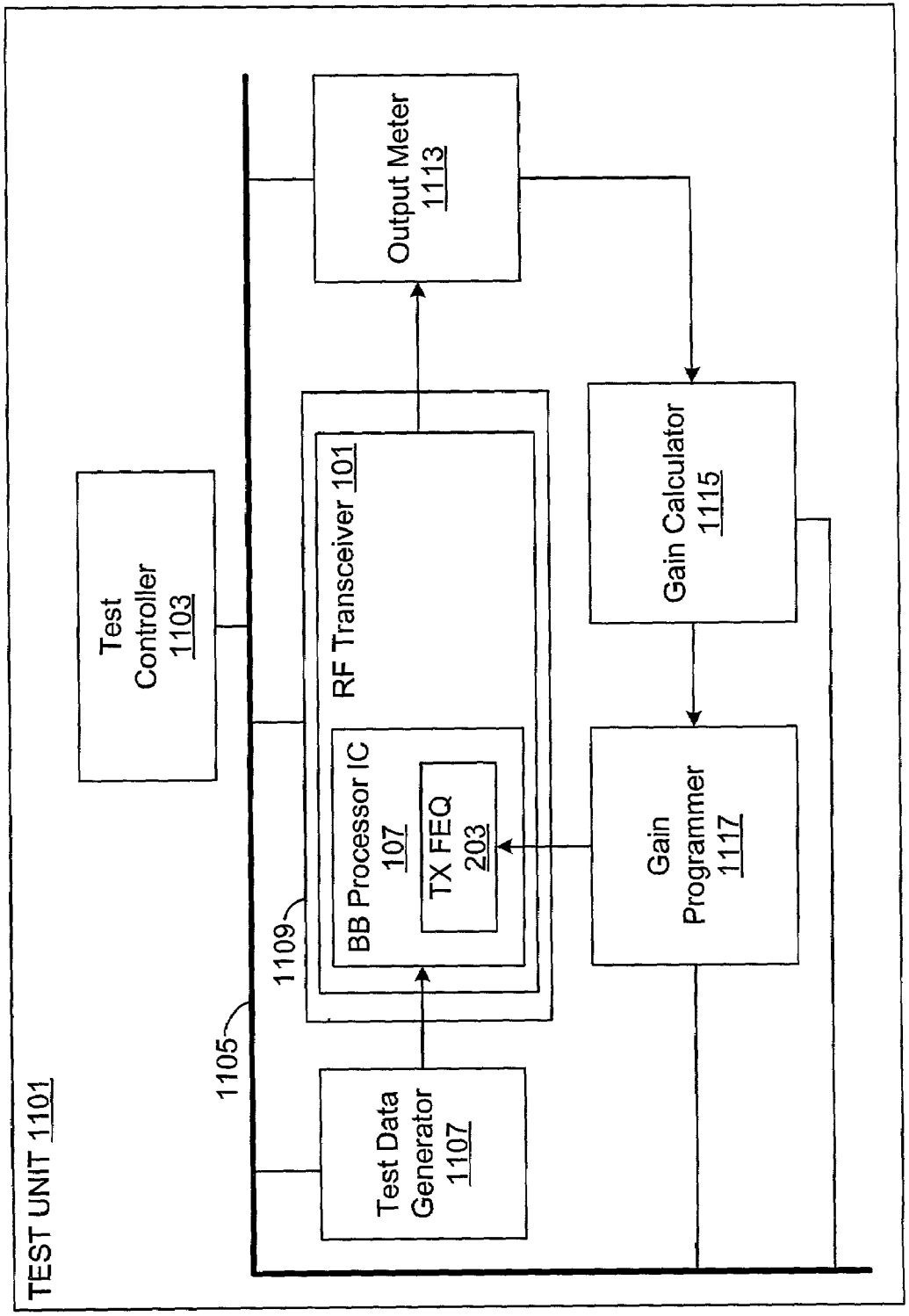
FIG. 11 is a simplified block diagram of an exemplary test unit that may be employed for programming a transmit frequency domain equalizer of the Baseband processor of the RF transceiver of FIG. 1 implemented in accordance with an embodiment of the present invention.

FIG. 11 is a simplified block diagram of an exemplary test unit 1101 that may be employed for programming a transmit frequency domain equalizer 203 of an IC incorporating the Baseband processor 107 implemented on the RF transceiver 101 in accordance with an embodiment of the present invention. The test unit 1101 includes a test controller 1103 for controlling operations of the test unit 1101 and for managing test operations. The test controller 1103 is coupled to a test data generator 1107, an RF transceiver 101 receptacle 1109, an output meter 1113, a gain calculator 1115 and a gain programmer 1117 via bus signals 1105. The RF transceiver 101 incorporating the TX FEQ 203 for programming is plugged into the receptacle 1109.

The test controller 1103 initializes each of the functional blocks including the RF transceiver 101 for performing the test. Initialization includes controlling the gain programmer 1117 to program the TX FEQ 203 with initial gain values of zero dB (or unity gain) in order to properly measure TX filtering. As previously stated, one of the primary impairments of transmit operation is the frequency ripple or response due to SAW filters employed within the radio portion of the RF transceiver 101. However, by testing and measuring an entire RF transceiver 101 unit, other frequency impairments may be compensated, such as frequency domain impairments in the Baseband processor 107, other filtering in the radio 105, and any other external components used to provide filtering and impedance matching employed on the RF transceiver 101. The test controller 1103 instructs the test data generator 1107 to assert test data to the RF transceiver 101. In one embodiment, constant random data is applied at an input and the Baseband processor 107 generates corresponding test tones. The output meter 1113 measures the radio output spectrum including output magnitudes of the tones and applies the measured values to the gain calculator 1115. The gain calculator 1115 determines appropriate gain values for programming the taps of the TX FEQ 203, such as by employing the process described with reference to the flowchart of FIG. 10. The gain values are provided to the gain programmer 1117, which programs the TX FEQ 203 accordingly. Many variations are contemplated for the test unit 1101 and methods of performing the measurement and programming. For example, analog test data may be generated and applied directly to the radio 105 rather than processing the test data through the Baseband processor 107. The example provided is exemplary only for illustrating part of the manufacturing process.

It is appreciated that a transmit frequency domain equalizer according to embodiments of the present invention pre-compensates packets in the frequency domain to flatten the transmit filter response. The transmit output is better able to meet spectral mask requirements and has improved PER performance. The transmit frequency domain equalizer taps are selected so that average power is maintained between the input and the output of the transmit frequency domain equalizer. The transmit frequency domain equalizer may further be designed to yield 64 QAM packets with little or no quantization distortion at the input of the IFFT. The transmit frequency domain equalizer may be designed to bind tones together into zones to reduce the implementation complexity by reducing the number of FEQ taps. Tones in the same zone are scaled by the same tap. Intelligent selection of the gain values allows both coarse and fine levels of frequency domain shaping.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention.

The invention claimed is:

1. A transmit processor for processing data using a plurality of sub-carriers for transmission by a radio via a wireless channel, the radio including transmit filtering having a variant frequency response across a frequency range of the sub-carriers, the transmit processor comprising:
   a data modulator that incorporates data bits onto the plurality of sub-carriers according to a selected data rate;
   an (IFFT) processor that converts frequency domain signals into time domain signals; and
   a transmit frequency domain equalizer, coupled to the output of the data modulator and to the input of the IFFT processor, that employs a plurality of taps to pre-compensate the sub-carriers for the variant frequency response of the transmit filtering of the radio.

2. The transmit processor of claim 1, wherein the data modulator further comprises:
   a constellation map select that includes a plurality of constellation maps for supporting a corresponding plurality of data rates, the plurality of constellation maps each incorporating a corresponding normalization power gain that maintains relatively constant power across the plurality of constellation maps, the plurality of constellation maps including a 64 Quadrature Amplitude Modulation (QAM) constellation map using a normalization power gain with a selected gain that minimizes quantization distortion for 64 QAM.

3. The transmit processor of claim 2, wherein the constellation map
   select includes a 64 QAM constellation map with constellation points ±1, ±3, ±5 and ±7 and a normalization power gain of 1, a 16 QAM constellation map with constellation points ±6.125, ±2.0625 and a normalization power gain of 2.0625, a Quadrature Phase Shift Keying (QPSK) constellation map with constellation points ±4.5625 and a normalization power gain of 4.5625, and a Binary Phase Shift Keying (BPSK) constellation map with constellation points ±6.5 and a normalization power gain of 6.5.

4. The transmit processor of claim 2, the IFFT processor having a predetermined bit resolution, wherein the transmit frequency domain equalizer comprises:
   a memory storing a plurality of gain values; and
   a digital multiplier having a first input coupled to the output of the constellation map select, a second input coupled to an output of the memory and an output coupled to an input of the IFFT processor;
   wherein a maximum gain value of the plurality of gain values is chosen so that a constellation point provided from the 64 QAM constellation map having a maximum constellation point magnitude multiplied by the maximum gain value does not exceed the predetermined bit resolution of the IFFT processor.

5. The transmit processor of claim 4, further comprising:
   a nominal gain value of the plurality of gain values is chosen based on the maximum gain value and a maximum desired gain differential;
   a minimum gain value of the plurality of gain values is chosen to maintain symmetry with the maximum gain value with respect to the nominal gain value; and
   remaining gain values of the plurality of gain values being chosen to maintain symmetry between the minimum and maximum gain values with respect to the nominal gain value.

6. The transmit processor of claim 5, wherein the maximum desired gain differential is based on the IEEE 802.11a specification for Orthogonal Frequency Division Multiplexing (OFDM).

7. The transmit processor of claim 5, wherein the predetermined bit resolution of the IFFT processor is 9 bits, wherein the constellation map select includes a 64 QAM constellation map with constellation points ±1, ±3, ±5 and ±7 and a normalization power gain of 1, and wherein the plurality of gain values are selected as 16, 18, 19, 20, 21, 22, 23, 24, 25, 26, 27, 28, 29, 30, 32 and 36, corresponding to decibel (dB) gain values of −3.52, −2.49, −2.03, −1.58, −1.16, −0.76, −0.37, 0.0, 0.36, 0.70, 1.02, 1.34, 1.64, 1.94, 2.50, and 3.52 dB, respectively.

8. The transmit processor of claim 1, wherein the transmit frequency domain equalizer employs tone binding by grouping multiple sub-carriers into each of a plurality of zones and by scaling each zone with a corresponding equalizer tap.

9. The transmit processor of claim 8 for supporting an OFDM configuration with 52 sub-carriers, wherein the transmit frequency domain equalizer includes twenty taps for a corresponding twenty zones in which a lower fourteen sub-carriers and an upper fourteen sub-carriers are bound two at a time into an outer fourteen zones and wherein the middle twenty-four sub-carriers are bound four at a time into an inner six zones.

10. The transmit processor of claim 1, wherein the transmit frequency domain equalizer comprises:
a digital multiplier having a first input coupled to the output of the constellation map select, a second input for receiving selected gain values and an output coupled to the input of the IFFT processor;
a gain memory that stores a plurality of gain values; gain select logic, coupled to the gain memory, that selects gain values;
a plurality of storage registers, coupled to the gain select logic, that stores a gain value for each tap as selected by the gain select logic; and
tone select logic, coupled to the plurality of storage registers, that provides selected gain values to the second input of the digital multiplier.

11. The transmit processor of claim 10, wherein the gain select logic comprises:
a multiplexer with a select input; and
a plurality of programmable registers, coupled to the select input of the multiplexer, that stores a plurality of gain select index values.

12. The transmit processor of claim 11, wherein the gain memory stores 16 predetermined gain values and wherein the plurality of programmable registers each include four bits for selecting a gain value.

13. The transmit processor of claim 12, wherein the sub-carriers are bounded into twenty zones for a corresponding twenty taps of the transmit frequency domain equalizer, and wherein the plurality of programmable registers includes twenty gain select index values, one for each zone.

14. A radio frequency (RF) communication device, comprising:
an RF transmitter including filtering that converts data packets into RF signals suitable for transmission via an antenna, each data packet including a plurality of symbols and each symbol incorporating a plurality of sub-carriers, the filtering having a variant frequency response across a frequency range of the plurality of sub-carriers; and
a Baseband processor, coupled to the RF transmitter, that generates the data packets by incorporating data onto the plurality of sub-carriers of each symbol, the Baseband processor including a transmit frequency domain equalizer with a plurality of taps that pre-compensate the sub-carriers for the variant frequency response of the filtering, wherein the Baseband processor comprises a constellation map select, having an output coupled to an input of the transmit frequency domain equalizer, that includes a plurality of constellation maps for supporting a corresponding plurality of data rates, the plurality of constellation maps each incorporating a corresponding normalization power gain that maintains relatively constant power across the plurality of constellation maps, the plurality of constellation maps including a 64 Quadrature Amplitude Modulation (QAM) constellation map using a selected normalization power gain that minimizes quantization distortion for 64 QAM; and
an Inverse Fast Fourier Transform (IFFT) processor, having an input coupled to an output of the transmit frequency domain equalizer, the IFFT processor having a predetermined bit resolution, the transmit frequency domain equalizer employing a plurality of predetermined gain values and including a digital multiplier that has an input coupled to the output of the constellation map select and an output coupled to the input of the IFFT processor; and the 64 QAM constellation map having a maximum constellation point magnitude that when multiplied by a maximum gain value using the digital multiplier does not exceed the predetermined bit resolution of the IFFT processor.

15. The RF communication device of claim 14, wherein the constellation map select includes a 64 QAM constellation map with constellation points ±1, ±3, ±5 and ±7 and a normalization power gain of 1, a 16 QAM constellation map with constellation points ±6.125, ±2.0625 and a normalization power gain of 2.0625, a QPSK constellation map with constellation points ±4.5625 and a normalization power gain of 4.5625, and a BPSK constellation map with constellation points ±6.5 and a normalization power gain of 6.5.

16. The RF communication device of claim 15, wherein the plurality of predetermined gain values are 16, 18, 19, 20, 21, 22, 23, 24, 25, 26, 27, 28, 29, 30, 32 and 36, corresponding to decibel (dB) gain values of −3.52, −2.49, −2.03, −1.58, −1.16, −0.76, −0.37, 0.0, 0.36, 0.70, 1.02, 1.34, 1.64, 1.94, 2.50, and 3.52 dB, respectively.

17. The RF communication device of claim 14, wherein the transmit frequency domain equalizer employs tone binding in which the plurality of sub-carriers are organized into zones and wherein multiple sub-carriers in each zone are scaled by a corresponding one of the plurality of predetermined gain values.

18. The RF communication device of claim 17 for supporting an Orthogonal Frequency Division Multiplexing (OFDM) configuration with 52 sub-carriers, wherein the transmit frequency domain equalizer includes twenty taps for a corresponding twenty zones in which a lower fourteen sub-carriers and an upper fourteen sub-carriers are bound two at a time into an outer fourteen zones and wherein the middle twenty-four sub-carriers are bound four at a time into an inner six zones.

19. The RF communication device of claim 17, wherein the transmit frequency domain equalizer comprises:
the digital multiplier having a first input coupled to the output of the constellation map select, a second input for receiving selected gain values and an output coupled to the input of the IFFT processor;
a gain memory that stores the plurality of predetermined gain values; gain select logic, coupled to the gain memory, that selects gain values based on a gain select input;
a plurality of programmable registers, coupled to the gain select input of the gain select logic, that stores a plurality of gain select index values;
a plurality of storage registers, coupled to the gain select logic, that stores a gain value for each zone as selected by the gain select logic; and
zone select logic, coupled to the plurality of storage registers, that provides a selected gain value to the second input of the digital multiplier for each zone.

20. A method of pre-compensating transmit filtering of a wireless transmitter that transmits radio frequency (RF) signals via a wireless channel, the transmit filtering having a variant frequency response across a frequency range of the sub-carriers, the method comprising:
providing a transmit frequency domain equalizer within a Baseband portion of the transmitter;
determining a frequency response of transmit filtering of an RF portion of the transmitter across a frequency range of the sub-carriers;

programming taps of the transmit frequency domain equalizer to pre-compensate for the frequency response of transmit filtering;

providing a constellation map select with a plurality of constellation maps for supporting a corresponding plurality of data rates, the plurality of constellation maps including a 64 Quadrature Amplitude Modulation (QAM) constellation map; and selecting constellation point magnitudes and normalization factors for each constellation map to maintain constant power across the plurality of constellation maps, the 64 QAM constellation map having constellation point magnitudes and a normalization factor that minimizes quantization distortion for 64 QAM; and wherein the Baseband portion of the transmitter includes an Inverse Fast Fourier Transform (IFFT) processor having a predetermined bit resolution, selecting a maximum constellation point magnitude for the 64 QAM constellation map and a maximum gain value magnitude for the transmit frequency domain equalizer to prevent exceeding the predetermined bit resolution of the IFFT processor.

21. The method of claim 20, further comprising:

tone binding multiple sub-carriers together for each tap of the transmit frequency domain equalizer to reduce a total number of taps.

22. The method of claim 21, further comprising:

selecting gain values for the taps of the transmit frequency domain equalizer to maintain constant average power of the sub-carriers from input to output of the transmit frequency domain equalizer.

* * * * *